US012079935B2

(12) United States Patent
Harsha et al.

(10) Patent No.: US 12,079,935 B2
(45) Date of Patent: Sep. 3, 2024

(54) SECURING COMMUNICATION SESSIONS IN THE METAVERSE

(71) Applicant: Bank of America Corporation, Charlotte, NC (US)

(72) Inventors: Surampudi Sai Sri Harsha, Andhra Pradesh (IN); Ramshanker Thekkadath, Chennai (IN); Sridevi Ravindran, Hyderabad (IN); Santosh Bongoni, Hyderabad (IN); Prasad Bag, Mumbai (IN); Senthil Nathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 110 days.

(21) Appl. No.: 18/102,801

(22) Filed: Jan. 30, 2023

(65) Prior Publication Data

US 2024/0257466 A1 Aug. 1, 2024

(51) Int. Cl.
*G06T 17/20* (2006.01)
*G06V 10/74* (2022.01)
*H04L 9/32* (2006.01)

(52) U.S. Cl.
CPC .......... *G06T 17/205* (2013.01); *G06V 10/761* (2022.01); *H04L 9/3226* (2013.01)

(58) Field of Classification Search
None
See application file for complete search history.

(56) References Cited

U.S. PATENT DOCUMENTS

| | | | | |
|---|---|---|---|---|
| 11,416,599 | B2* | 8/2022 | Ford | G06F 21/46 |
| 11,444,945 | B1* | 9/2022 | Ford | H04L 63/0884 |
| 2012/0256954 | A1* | 10/2012 | Soon-Shiong | A63F 13/335 |
| | | | | 345/633 |
| 2018/0033010 | A1* | 2/2018 | Ustinov | G06N 7/01 |
| 2019/0179405 | A1* | 6/2019 | Sun | G06F 1/1686 |

OTHER PUBLICATIONS

"Phishing," Wikimedia Foundation, Inc., https://en.wikipedia.org/wiki/Phishing, Nov. 23, 2022.

(Continued)

*Primary Examiner* — Nurun Flora
(74) *Attorney, Agent, or Firm* — Weiss & Arons LLP

(57) ABSTRACT

A method for authenticating a communication session in a metaverse environment may be provided. The method may include authenticating a user device and an entity associated with the virtual kiosk in order to initiate the communication session. The authenticating of the user device may include confirming that a selected base 3D mesh matches a pre-selected base 3D meshes stored within an identity profile associated with the user's device. In response to the confirming, the method may include authenticating the user's device. The method may further include authenticating the virtual kiosk by distorting the pre-selected base 3D mesh to generate a distorted base 3D mesh and comparing the distorted base 3D mesh to a static distorted base 3D mesh stored at the user's device. The method may also include confirming that the generated distorted base 3D mesh matches the static distorted base 3D mesh and authenticating the virtual kiosk.

20 Claims, 6 Drawing Sheets

Base 3D Rendered Mesh in Metaverse      Distorted 3D Rendered Mesh in Metaverse

(56) References Cited

OTHER PUBLICATIONS

G. Weisen, "What is a Base Mesh?" https://www.easytechjunkie.com/what-is-a-base-mesh.htm, Retrieved on Nov. 24, 2022.
Linda Tucci et al., "What is the Metaverse? An Explanation and In-Depth Guide," https://www.techtarget.com/whatis/feature/The-metaverse-explained-Everything-you-need-to-know, Nov. 18, 2022.

\* cited by examiner

SECURING COMMUNICATION SESSIONS IN THE METAVERSE

FIELD OF TECHNOLOGY

Aspects of the disclosure relate to securing communication sessions within the metaverse environment.

BACKGROUND OF THE DISCLOSURE

The metaverse is a virtual shared space that is accessed via the internet. In its broadest form, the metaverse may encompass the entire social and economic structure that exists in both the actual and virtual worlds. Avatars, content, and goods may all travel around freely.

In the metaverse, a virtual world experience may be created by simulating human emotions and gestures. Individuals in the metaverse may communicate and transact with each other and with digital three-dimensional ("3D") items.

The term extended reality (XR) may encompass all types of digitally enhanced perception, including augmented reality (AR), mixed reality (MR), and the completely immersive virtual reality (VR). Customers may interact with both live and digital agents in various XR modalities.

As the capabilities of performing transactions within XR modalities including the metaverse increases, authentication breach and phishing may increase as well.

A user may communicate in the metaverse using an avatar. An entity is represented within the metaverse as a virtual kiosk. The avatar, representing the user, communicates with various virtual kiosks, representing various entities. Because the avatar represents the user and the virtual kiosks represents an entity, there is a large possibility for malicious activity that impersonates either the user or the entity.

It would be desirable therefore, to create an additional anti-phishing authentication layer for securely verifying the user and the virtual kiosk that represents the entity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
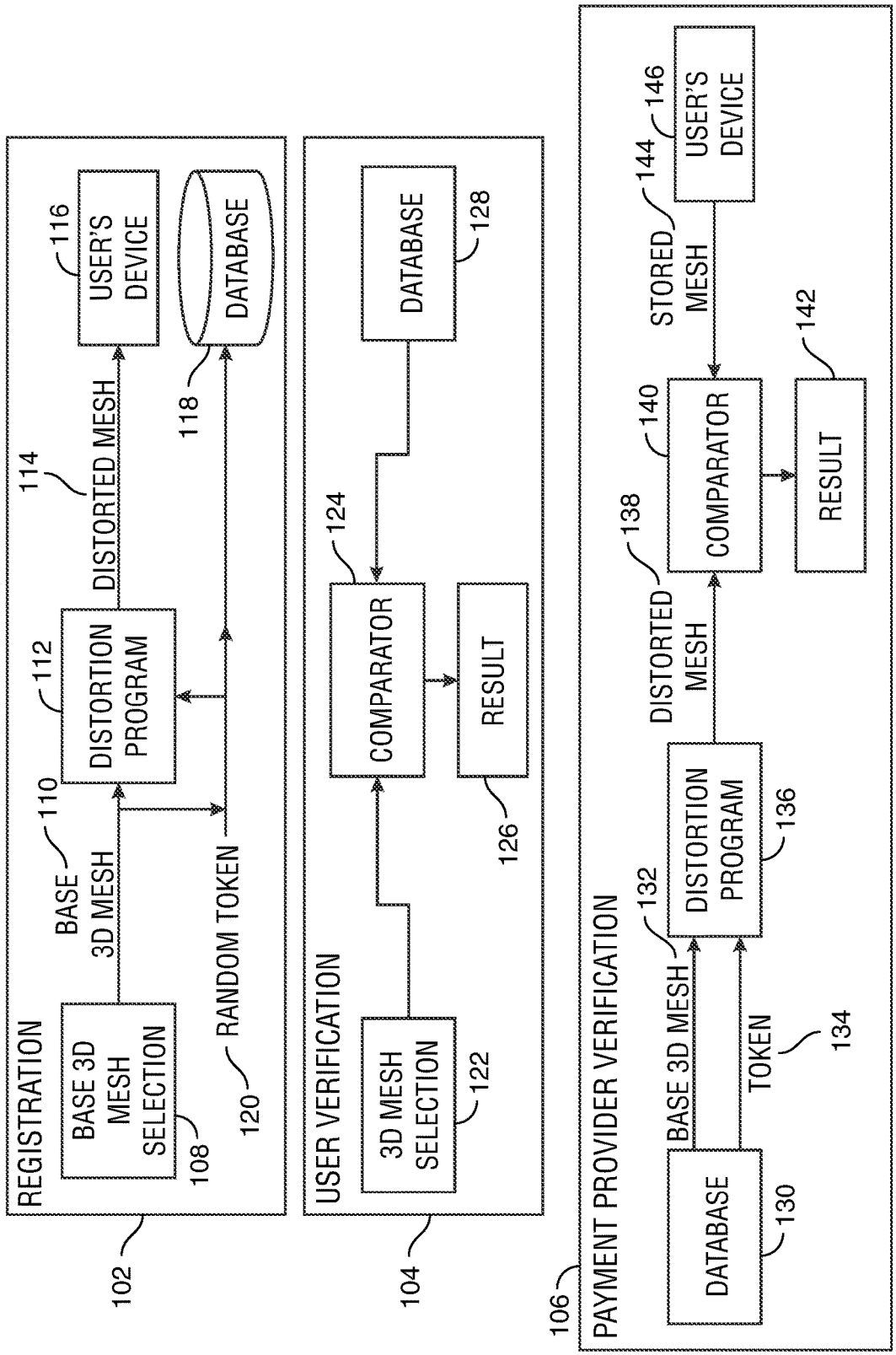
FIG. 1 shows an illustrative flow diagram in accordance with principles of the disclosure.

A system for authenticating a communication session within a metaverse environment is provided. The communication session may occur within a secure 3D space of the metaverse environment.

The system may include a virtual kiosk. The virtual kiosk may be located within the metaverse environment. The virtual kiosk may represent an entity. The virtual kiosk may be in communication with one or more entity databases. The one or more entity databases may be linked to one or more entity hardware processors and one or more entity servers.

The system may also include a customer avatar located within the metaverse environment. The customer avatar may represent a user. The customer avatar may be in communication with the user. The customer avatar may be controlled by input at a user's device.

The system may leverage aspects of the metaverse interaction for streamlined verification of user identity. For example, the system may verify the identity of the customer by authenticating the customer avatar.

A metaverse application may initiate and maintain the metaverse session. The metaverse application may be associated with a financial institution. Client devices on the agent side and the customer side may interface with the metaverse application.

For a customer to be enabled to access the virtual kiosk within the metaverse environment, the customer's device may need to be registered with the virtual kiosk. The registration process may include creating an identity profile for the user's device. In some embodiments, the identity profile may be linked to the account associated with the user of the device.

During a registration process, the one or more entity servers may be configured to register a user's device with the virtual kiosk associated with the entity. The registration process may be a one-time process. The one or more entity servers may create an identity profile for the user's device and save the identity profile at one or more entity databases.

During the registration process, the one or more entity servers may be configured to receive a selection of a base 3D mesh from a first plurality of base 3D meshes displayed at an interface of the virtual kiosk.

The first plurality of base 3D meshes displayed may be randomly generated by the one or more entity servers. The customer avatar may be enabled to select any one of the first plurality for being associated with the identity profile.

A base 3D mesh may be an object modeled in a virtual 3D space. The object may be modeled using a 3D computer graphics program. The base 3D mesh may be simple and unfinished. The base 3D mesh may include minimal features and without texture mapping.

The base 3D mesh may be an image. The base 3D mesh may be any shape and/or size.

During the registration process the one or more entity servers may also be configured to receive input of a username and password. The customer avatar may input the username and password at the interface of the virtual kiosk. The username and password may be saved in the identity profile.

The one or more entity servers may be configured to generate a random token based on metadata associated with the user's device. The metadata may be stored at the one or more entity databases.

The one or more entity servers may further be configured to create the identity profile for the user's device. The identity profile may include the username, the password, the random token and the base 3D mesh selected from the first plurality of base 3D meshes. The base 3D mesh may be referred to herein as a pre-selected base 3D mesh.

The identity profile may also include data associated with the user's device. The data may include a device identifier of the user's device. The identity profile for each customer may be stored in association with customer account data.

In some embodiments, customer device registration may include download or installation of software for secure metaverse access.

Following the creating of the identity profile, the one or more entity servers may be configured to store the identity profile at the one or more entity databases. A timestamp of the time the identity profile was created may also be stored in the identity profile for future authentication.

During the registration process, the one or more entity servers may be configured to execute a distortion function on the pre-selected base 3D mesh. The distortion function may output a static distorted base 3D mesh.

The distortion function may be a one-way function.

The distortion function may be an algorithm executed on a combination of data points to distort the base 3D mesh and output a distorted base 3D mesh. The one or more entity servers may be configured to select a vertex on the pre-selected base 3D mesh. The vertex may include an x-coordinate, a y-coordinate and a z-coordinate.

The one or more entity servers may be configured to combine the selected vertex and additional metadata to generate a distorted vertex.

The metadata may include device data associated with the user, a timestamp of registration of the user's device with the entity and metaverse environmental data.

For the x-coordinate, the one or more entity servers may combine the x-coordinate, the random token and the metadata to generate a second x-coordinate. The second x-coordinate may be referred to herein as an x-shift.

For the y-coordinate, the one or more entity servers may combine the y-coordinate, the random token and the metadata to generate a second y-coordinate. The second y-coordinate may be referred to herein as a y-shift.

For the z-coordinate, the one or more entity servers may combine the z-coordinate, the random token and the metadata to generate a second z-coordinate. The second z-coordinate may be referred to herein as a z-shift.

The distorted vertex may include the x-shift, the y-shift and the z-shift. The one or more entity servers may create a static distorted base 3D mesh using the distorted vertex.

In some embodiments, the distorted x-coordinate may be an expanded x-coordinate. The expansion may be an expansion of the vertex along a positive x-axis. The expansion may be an expansion of the vertex along a negative x-axis. The expansion may be an expansion of the vertex along both the positive and negative x-axis.

In some embodiments, the distorted y-coordinate may be an expanded y-coordinate. The expansion may be an expansion of the vertex along a positive y-axis. The expansion may be an expansion of the vertex along a negative y-axis. The expansion may be an expansion of the vertex along both the positive and negative y-axis.

In some embodiments, the distorted z-coordinate may be an expanded z-coordinate. The expansion may be an expansion of the vertex along a positive z-axis. The expansion may be an expansion of the vertex along a negative z-axis. The expansion may be an expansion of the vertex along both the positive and negative z-axis.

In some embodiments the distorted vertex may include a transforming of the selected vertex into a range of values along the x-axis, a range of values along the y-axis and a range of values along the z-axis.

The one or more entity servers may be configured to display the static distorted base 3D mesh at the virtual kiosk to the customer avatar. The customer avatar may capture the static distorted base 3D mesh for future reference and authentication.

The one or more entity servers may also be configured to transmit the static distorted base 3D mesh to the user's device for storage.

In some embodiments, customer registration may be performed outside the metaverse environment. Customer registration may be performed at a financial institution portal, at a mobile device application or via any suitable method. A customer may communicate with a mobile device application using an interactive response system, via a live agent interaction, or via any suitable method. Customer registration may be stored in the database associated with the financial institution.

At a time that the customer avatar attempts to initiate a communication session with the virtual kiosk, the customer avatar may be authenticated and the virtual kiosk may be authenticated.

The communication session may be for performing a transaction with the entity associated with the virtual kiosk.

In some embodiments, standard security protocols may be adhered to when logging in to create the communication session. Such security protocols may include two-factor authentication ("2FA") and know your customer ("KYC") protocols.

Additionally, in order to prevent, or at least minimize a phishing application, during an authentication process, the one or more entity servers may be configured to verify the customer avatar and the virtual kiosk.

Authentication of a customer avatar in the metaverse environment may be based on meta-information associated with the avatar. Authentication may be based on one or more features associated with the avatar appearance. The avatar may be preregistered with the financial institution and avatar details may be stored in association with a customer account. In some embodiments, avatar details may be recorded in the course of metaverse interactions with a customer and stored for future reference.

In some embodiments, authentication of a customer avatar may be based on metadata associated with a customer device used to control the avatar. The device may be preregistered with the financial institution and device information may be stored in association with a customer account. In some embodiments, a device token may be used for authentication. In some embodiments, device details may be recorded in the course of metaverse interactions with a customer and stored for future reference.

In some embodiments, authentication of the avatar may be based on historical modes of controlling the avatar. For example, authentication may be based on a method of interaction with the device used to control the avatar. In some embodiments, these control methods may be recorded in the course of metaverse interactions with a customer and stored for future reference. A user may control the avatar using touch-based input, touch-free input, and/or a combination of touch-based and touch-free inputs.

In some embodiments, user inputs may be hands-on. Hands-on user input may be received via keystrokes on a keyboard, buttons on a surface of the device, movement of an input device such as a joystick, use of a stylus, or by any suitable method. User input may be received via a device touch screen. Touch-based gestures may include swiping, tapping, squeezing and any other suitable touch-based gestures or combination of touch-based gestures.

In some embodiments, user inputs may be hands-free. Hands-free input may include voice commands, gesture recognition, eye tracking or any other suitable method. Gesture recognition may include air-based hand and/or body gestures. Air-based gestures may be performed without touching the device.

A user device may include one or more sensors. Illustrative sensors may include a touch screen, camera, accelerometer, gyroscope, and any other suitable sensors. Sensors may detect hands-free input such as air gestures or eye movement.

A touch-sensitive screen may capture finger motions. The device may include specialized software executable by the device microprocessor for automatic conversion of finger motions as they are input by the user on the touch-sensitive screen.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to detect a touch point. Resistive-touch technology is also relatively less expensive than other touch sensing technologies.

The touch-sensitive screen may utilize capacitive touch technology to detect user touch points. Screens constructed using capacitive touch technology may identify touches points by detecting an electrical disturbance created when the user touches the screen. The human body is an electronical conductor and, contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging and infrared acrylic projection.

A user device may include a touch-sensing controller for detecting a touched location. The touch-sensing controller may include an application-specific integrated circuit (ASIC) chip and a digital signal processor (DSP) chip.

In some embodiments, the touch-sensitive screen may provide "single-touch" functionality. In some embodiments, the touch-sensitive screen may provide "multi-touch" functionality. Single-touch functionality may detect input from one user touch on the touch-sensitive screen. Single-touch functionality may also recognize double finger taps or a long-press functionality. Multitouch functionality may detect input from two or more simultaneous user touch points on the touch-sensitive screen. For example, a pinch-to-zoom feature is a multi-touch functionality.

The user device may include a haptic response system. The haptic response system may provide a responsive force, vibration or movement in response to receiving a user's touch input. For example, the haptic response system may provide a responsive vibration to a user's touch-based selection of a payment option. The haptic response system may include an eccentric (unbalanced) rotating mass, a linear resonant actuator, a piezoelectric actuator or any other suitable hardware for providing a haptic response.

The user device may include smart glasses or a virtual reality headset. The smart glasses or virtual reality headset may be used alone or in combination with another device. The customer avatar may interact with an agent avatar in the metaverse environment. The metaverse environment may simulate a banking center environment.

For authenticating the customer avatar for initiation of a communication session, the one or more entity servers may be configured to display on the interface of the virtual kiosk a second plurality of base 3D meshes. The second plurality of base 3D meshes may include the pre-selected base 3D mesh.

The authenticated communication session may be an electronic communication session at the virtual kiosk. The communication session may be between the virtual kiosk and the customer avatar. The communication session may be between the virtual kiosk and a user's device.

The one or more entity servers may be configured to receive a selection of a base 3D mesh from the second plurality of base 3D meshes.

The one or more entity servers may further be configured to confirm that the base 3D mesh selected from the second plurality of base 3D meshes matches the pre-selected base 3D mesh.

In response to the confirming, the one or more entity servers may be configured to authenticate the customer avatar.

In some embodiments, when the base 3D mesh selected from the second plurality of base 3D meshes does not match the pre-selected base 3D mesh, the one or more entity servers may be configured to transmit an error message notification for display at the virtual kiosk. In some embodiments when there is a discrepancy, the one or more entity servers may execute standard protocols for failure of login credentials.

The one or more entity servers may also be configured to authenticate the virtual kiosk as being associated with the entity. The authenticating of the virtual kiosk may be performed to prevent and/or at least minimize the probability of a phishing application running the virtual kiosk and impersonating the entity.

The authenticating of the virtual kiosk may include executing the distortion function on the pre-selected base 3D mesh to generate a distorted base 3D mesh.

The authenticating may further include displaying the distorted base 3D mesh on the interface of the virtual kiosk. The authenticating may further include receiving confirmation from the customer avatar that the generated distorted base 3D mesh matches the static distorted base 3D mesh.

In response to the confirming, the one or more entity servers may be configured to authenticate the virtual kiosk.

In response to the authenticating of both the customer avatar and the virtual kiosk, the one or more entities may be configured to create the authenticated session.

In response to the authenticating of the customer avatar and the authenticating of the virtual kiosk, the one or more entity servers may further authenticate the customer avatar by prompting the customer avatar for input of a password. The one or more entity servers may receive the password and confirm that the inputted password matches the password stored in the identity profile.

A method for authenticating a communication session in a metaverse environment is provided. The method may include a processor running a metaverse application. The processor may be running on one or more entity servers.

The metaverse application may initiate and maintain the metaverse session. The metaverse application may be associated with a financial institution. Client devices on the agent side and the customer side may interface with the metaverse application.

The customer may use the link to access a bidirectional, secure metaverse session. The customer may log into the metaverse session using a digital avatar. The digital avatar may be registered to the customer.

The method may include creating an authenticated session between a customer avatar and a virtual kiosk. The authenticated session may be created following an authentication of the customer avatar and an authentication of the virtual kiosk as being associated with the entity.

The customer avatar may be running via input at a user's device. The user's device may be a registered device of the entity. The authenticating may include confirming the validity of the customer avatar.

The authenticating of the customer avatar may include displaying, on an interface of the virtual kiosk, a plurality of base 3D mesh. The plurality of base 3D mesh may be a randomly generated plurality of base 3D mesh. The plurality of base 3D mesh may include a pre-selected base 3D mesh stored in an identity profile associated with the user's device.

The authenticating of the customer avatar may further include receiving at the interface, a selection, via the customer avatar, of a base 3D mesh from the plurality of base 3D meshes.

The authenticating of the customer avatar may further include confirming, via the virtual kiosk, that the base 3D mesh matches the pre-selected base 3D mesh stored within the identity profile of the customer avatar at a database of the entity.

In response to the confirming, the method may include authenticating the customer avatar.

The method may also include authenticating the virtual kiosk as being associated with the entity. The authenticating of the virtual kiosk may include executing a distortion function on the pre-selected base 3D mesh to generate a distorted base 3D mesh.

Following the executing of the distortion function, the method may include comparing the distorted base 3D mesh to a static distorted base 3D mesh stored at the user's device. The static distorted base 3D mesh may be an originally distorted base 3D mesh distorted during registration of the user's device with the entity.

It should be appreciated that the static distorted base 3D mesh may not be stored at entity databases. The static distorted base 3D mesh may not be stored within the identity profile of the user's device.

Because the distortion function is a one-way function, when the processor re-generates a distorted base 3D mesh identical to the static distorted base 3D mesh, this may be an automatic authentication that the virtual kiosk is a legitimate kiosk associated with the entity.

Following the executing of the distortion function, the method may include confirming that the generated distorted base 3D mesh matches the static distorted base 3D mesh.

In response to the confirming, the method may include authenticating the virtual kiosk as being associated with the entity.

In response to the authenticating of the customer avatar and the authenticating of the entity, the method may include creating the authenticated session.

In some embodiments, prior to authenticating the customer avatar in the metaverse environment, the method may include performing a one-time registration of the user's device with the entity. The one-time registration process may include creating an identity profile for the user's device. Following the creating of the identity profile, the identity profile may be stored at the entity database for reference and authentication when the user's device attempts to login to the entity system and/or virtual kiosk.

The creating of the identity profile for the user's device may include selecting at the interface of the virtual kiosk, via the customer avatar, a base 3D mesh from a plurality of base 3D meshes displayed to the customer avatar. It should be appreciated that the base 3D mesh may be referred to herein as the pre-selected base 3D mesh.

The method may further include receiving at the virtual kiosk, input of a password via the customer avatar. The customer avatar may select a unique password as part of the identity profile.

The method may also include generating a random token. The random token may be generated based on metadata associated with the user's device. The metadata may be stored at the one or more entity databases.

The method may further include storing, at the one or more entity databases, the pre-selected base 3D mesh, the random token and the password as the identity profile for the customer avatar.

The method may also include marking a time-stamp for the time of registration of the user's device with the entity and storing the time-stamp within the identity profile.

The method may further include generating the static distorted base 3D mesh by executing the distortion function on the pre-selected base 3D mesh to generate the static distorted base 3D mesh.

The distortion function may include combining a selected vertex at the base 3D mesh, the random token and metadata associated with a user of the user device to generate a distorted vertex. The metadata may include device data associated with the user, the timestamp of registration of the user's device with the entity and metaverse environmental data.

Using the distorted vertex, the method may include creating a static distorted base 3D mesh. The method may further include displaying the static distorted base 3D mesh to the customer avatar. Following the displaying, the method may include storing the static distorted base 3D mesh at the user's device.

In some embodiments, following authentication of the customer avatar, the method may include determining that the device identifier stored within the identity profile does not match the user's device attempting to log in. This may occur when the user replaces the user's device with a second device. In this embodiment, the one or more entity servers may initiate one or more verification methods to confirm that the user logging in with the second device is the same user associated with the identity profile.

When the one or more entity servers confirms that the user of the first device is the user of the second device, the identity profile of the user is updated to include the device identifier of the second device.

Additionally, the static distorted base 3D mesh stored at the user's device needs to be updated. The static distorted base 3D mesh may be regenerated to incorporate the second device into the algorithm for the generating.

The method may include regenerating the static distorted base 3D mesh. Following the regenerating, the method may include displaying the regenerated static distorted base 3D mesh to the customer avatar. The method may further include overwriting the static distorted base 3D mesh stored at the user's device with the regenerated static distorted base 3D mesh.

In some embodiments, prior to creating the authenticated session, the method may further include further authenticating the customer avatar by requesting input of the password from the customer avatar. The method may further include receiving the password at the interface of the virtual kiosk.

The method may further include confirming that the password matches the password stored in the identity profile.

It should be appreciated that in some embodiments the comparing of the distorted base 3D mesh to the static distorted base 3D mesh and the confirming that the generated distorted base 3D mesh matches the static distorted base 3D mesh may be performed by the customer avatar. When the customer avatar performs the confirmation, this may be a visual confirmation. The customer avatar may view the display of the distorted base 3D mesh and based on memory may either authenticate or deny the confirming.

In some embodiments the comparing of the distorted base 3D mesh to the static distorted base 3D mesh and the confirming that the generated distorted base 3D mesh matches the static distorted base 3D mesh, may be performed automatically by an application programming interface ("API") associated with the virtual kiosk. A java script may be executed at the time of the generating of the distorted base 3D mesh and may run a comparison check to the static base 3D mesh stored at the user's device.

In some embodiments, the comparing of, the distorted base 3D mesh to the static distorted base 3D image and the confirming that the generated distorted base 3D mesh matches the static distorted base 3D mesh may be performed by both the customer avatar and the API.

In some embodiments, when the customer avatar visually confirms the authenticity of the generated distorted base 3D mesh, the customer avatar may mistakenly confirm the authenticity when in reality the distorted base 3D mesh is not correct. If the generated distorted base 3D mesh is very similar to the static distorted base 3D mesh but not the exact same, that slight nuance in the distortion may not be detected by a user's eye. Digital authentication may be enabled to automatically detect that slight nuance. The confirming via the API may provide for that added layer of authentication.

When either the customer avatar is not authenticated or the virtual kiosk is not authenticated, the method may include terminating the creating of the authenticated session.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows three illustrative flow diagrams. Flow diagram 102 displays a registration process for a user of an entity within the metaverse environment. Flow diagram 104 shows a user verification process for the user within the metaverse environment. Flow diagram 106 shows a payment provider verification process within the metaverse environment.

At process 102, a one-time registration of the user's device may be performed. The one-time registration may enable generating an identity profile for the user's device that may be used as an additional layer of authentication for an entity within the metaverse environment. This additional layer may at least minimize phishing within the metaverse.

At 108 a selection of a base 3D mesh may be selected by a user. The user may be in the form of a customer avatar at a virtual kiosk associated with the entity. The selection may be selected from a plurality of base 3D mesh displayed to the user. It should be appreciated that the mesh may be in the form of an image, shape or any other suitable form.

At 110, the selected base 3D mesh may be transmitted to a distortion program 112 for distorting. The distortion program 112 may be a function and/or computing algorithm applied to the mesh to distort the shape of the mesh.

The distortion function may also apply a random token 120 to the function for generating the distorted mesh. The output of the distortion function 112 may be a distorted mesh 114. The distorted mesh may be transmitted to the user's device 116 and may be stored at the user's device.

The random token may be saved and stored at database 118 associated with the entity. The base 3D mesh 110 may also be stored at database 118.

The random token 120 and the base 3D mesh 110 may be used as an identity profile for the user and/or the user's device.

At process 104, a verification of a user attempting to create a session at the virtual kiosk may be performed. A plurality of base 3D mesh may be displayed to the user. The base 3D mesh that the user initially selected at the time of registration may be included in the plurality of base 3D mesh. At 122, the user may select a base 3D mesh from a selection of base 3D mesh. Comparator 124 may compare the selected base 3D mesh to the base 3D mesh stored within the user's identity profile at database 128. Following a comparison, the result 126 may either authenticate the user or deny the user from being authenticated.

At process 106, the payment provider may be verified. The payment provider may be verified by the user. This step of authentication may enable at least minimizing the probability of an illegitimate entity impersonating a legitimate entity and impersonating the user and/or the user's device.

At process 106, following the entity authenticating the user, base 3D mesh 132 and random token 134 may be retrieved from database 130. Both base 3D mesh 132 and random token 134 may be stored in the identity profile of the user at database 130. Following the retrieval, a distortion function 136 may be executed to re-create the distorted image using the base 3D mesh to replicate the stored static distorted base 3D mesh 144 originally distorted.

Because the static distorted base 3D image is not saved at the database, the re-creating of the distorted image to be an exact match to the originally distorted image 144 stored at the user's device 146, may be a validation that the payment provider is authentic.

Distortion program 136 may re-recreate a distorted mesh 138 and transmit it to comparator 140 for authentication. Comparator 140 may retrieve the static distorted base 3D image 144 stored at user's device 146 for comparison and results 142.

Figure 2:
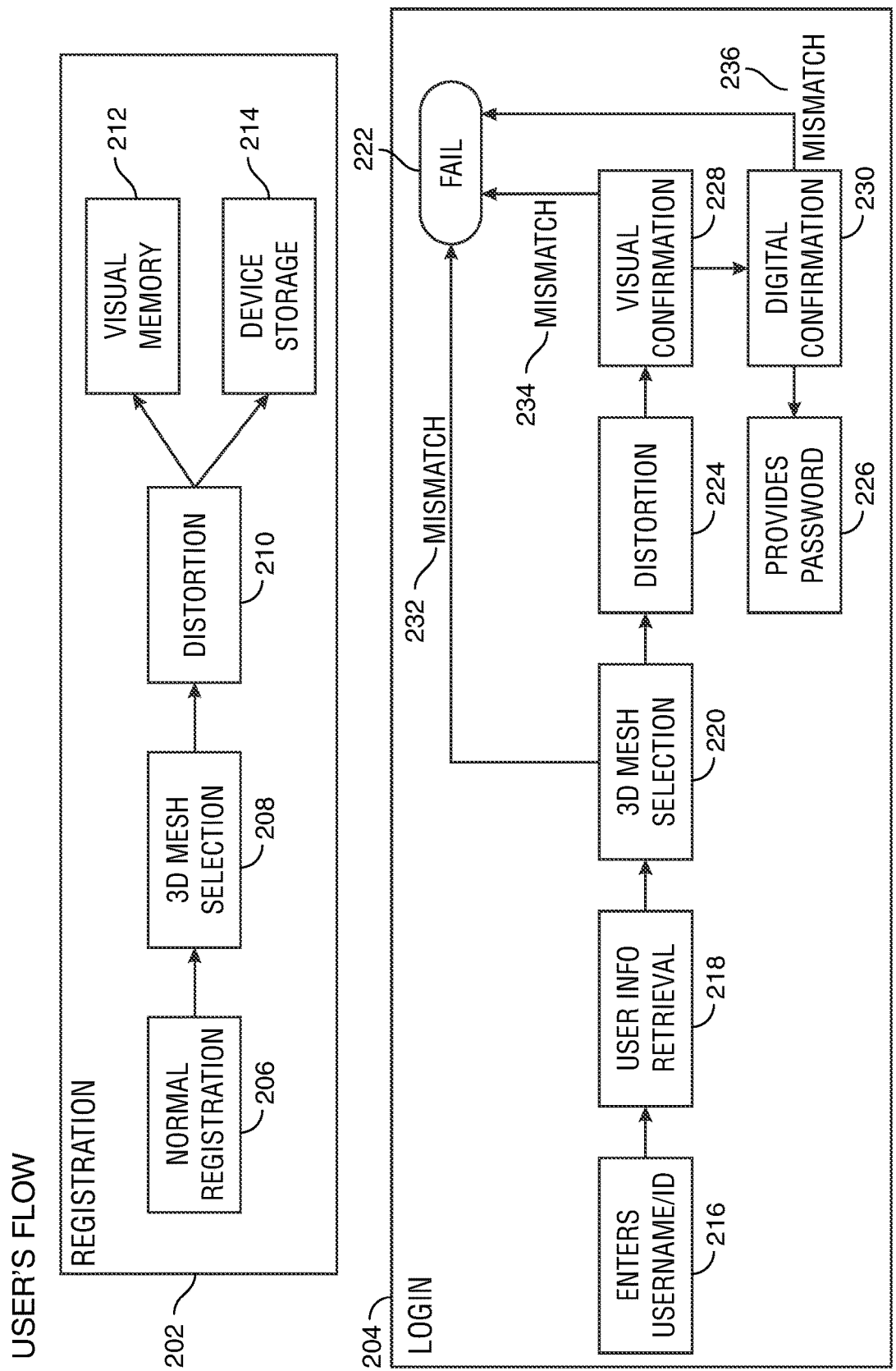
FIG. 2 shows an illustrative flow diagram in accordance with principles of the disclosure.

FIG. 2 shows an illustrative flow diagram in accordance with principles of the disclosure. Flow diagram 202 may be a one-time registration of the user's device within the metaverse environment associated with an entity. Flow diagram 202 may be the user's flow.

A user, upon registration, may perform a standard registration process 206. Standard registration process 206 may be a standard registration of the user and/or the user's device. The user may perform registration at a virtual kiosk associated with an entity within the metaverse environment.

Standard registration 206 may include input of basic user identification data for creating an identity profile for the user. User identification data may include a name, date of birth, address, email address and any other suitable identification data. The user may also select a password for being associated with a username for the identity profile.

Following input of basic identification data, user may be prompted to select a base 3D mesh from a selection of base 3D meshes displayed, as shown at 208. Following a selection of the base 3D mesh, distortion function 210 may be executed for distorting the base 3D mesh. The selected base 3D mesh may be used as additional identification data for verifying the user within the metaverse environment.

Distortion function 210 may be executed and a distorted base 3D mesh may be outputted. The distorted base 3D mesh may be displayed to the user to enable the user to recognize the distorted base 3D mesh in a future authentication session. This may be referred to as visual memory 212.

The distorted base 3D mesh may also be stored at the user's device 214. The distorted base 3D mesh may not be stored at the databases associated with the entity.

Flow diagram 204 may display the process of a user logging-in to a virtual kiosk. This process may occur at any given time following the one-time registration process shown at 202.

Log-in process 204 may occur between an avatar and a virtual kiosk associated with an entity. Log-in process 204 may occur between a user's device and an online website associated with the entity.

At 216, a username and ID may be inputted for identifying the user/avatar/user's device. Following verification of the username and ID, the identity profile of the user and the data stored within the identity profile may be retrieved, as shown at 218.

The user may be verified when the correct base 3D mesh is selected from a plurality of base 3D meshes displayed to the user. At 220, a base 3D mesh is selected.

When the base 3D mesh selected does not match the base 3D mesh stored within the identity profile, as shown at 232, authentication may fail, as shown at 222.

When the base 3D mesh selected is verified, distortion function 224 may be applied to the base 3D mesh. Distortion function 224 may, upon execution, distort the base 3D mesh stored at the user's identity profile and output a distorted base 3D mesh. Visual confirmation 228 may be performed by the user. The user may view the distorted base 3D mesh and either verify the authenticity of the distortion or deny verification.

When there is a mismatch 234, based on visual confirmation, between the distorted base 3D mesh and the originally distorted base 3D mesh, the user may deny the authenticity of the entity claiming to be associated with the virtual kiosk and a communication session may fail to be executed, as shown at 222.

When it is determined that the distorted base 3D mesh does match the originally distorted base 3D mesh based on visual confirmation 228, the user may confirm authenticity.

In some embodiments, following visual confirmation 228, a communication session may be automatically initiated. In some embodiments, following visual confirmation 228, a digital confirmation 230 may be performed automatically via the entity server. A java script file may be executed to verify the distorted base 3D mesh by comparing it to the distorted base 3D mesh stored at the user's device. When there is a mismatch 236, a communication session may fail to be executed, as shown at 222.

When the distorted base 3D mesh is confirmed to be a match, the user may be prompted to input a password prior to authenticating the communication session, as shown at 226. Upon confirmation of the password, a communication session may be initiated and the user may be enabled to perform a transaction.

Figure 3:
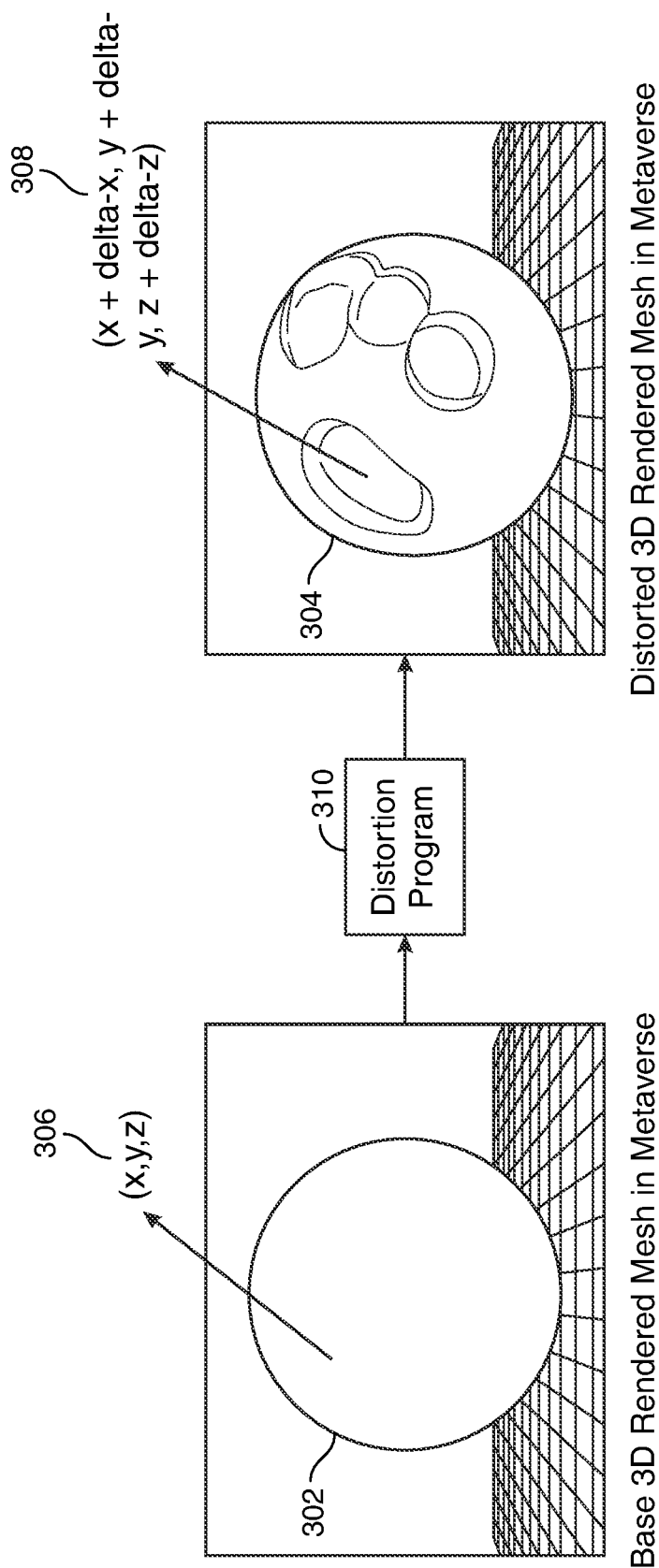
FIG. 3 shows an illustrative diagram in accordance with principles of the disclosure.

FIG. 3 shows an illustrative diagram of a base 3D mesh 302 in the metaverse. Base 3D mesh 302 is shown to be a shape of a circle. It should be appreciated that base 3D mesh may be in any form or shape.

A vertex 306 may be selected for the base 3D mesh prior to distorting the base 3D mesh. Vertex 306 may include an x-coordinate, a y-coordinate and a z-coordinate.

Distortion program 310 may be an application. Distortion program 310 may execute one or more algorithms that output a distorted shape based on the base 3D mesh. The distorted shape may be due to an expansion of the vertex following the execution of the algorithm for distorting the shape. Distortion program may output a distorted base 3D mesh shown at 304.

Distortion program 310 may use vertex 306 and apply the distortion on the vertex to get a distorted vertex. Distorted vertex 308 may be calculated using a combination of the vertex 306, metadata associated with the user's device, the random token stored in the user's identity profile and metaverse environmental data.

Distorted vertex 308 may be the x, y and z coordinates of vertex 306 and the additional data combined. Distorted vertex 308 may be calculated as '(x+delta-x, y+delta-y, z+delta-z)'.

Distorted vertex 308 may include an expansion along the x-axis, y-axis and z-axis that may be either positive, negative or bi-directional.

It should be appreciated that more than one user may select the same base 3D mesh as part of the identity profile for that user. However, each base 3D mesh may have a unique vertex selected for distortion. Because each vertex is not identical to another user's base 3D mesh vertex, the distorted mesh may be unique for each user.

Figure 4:
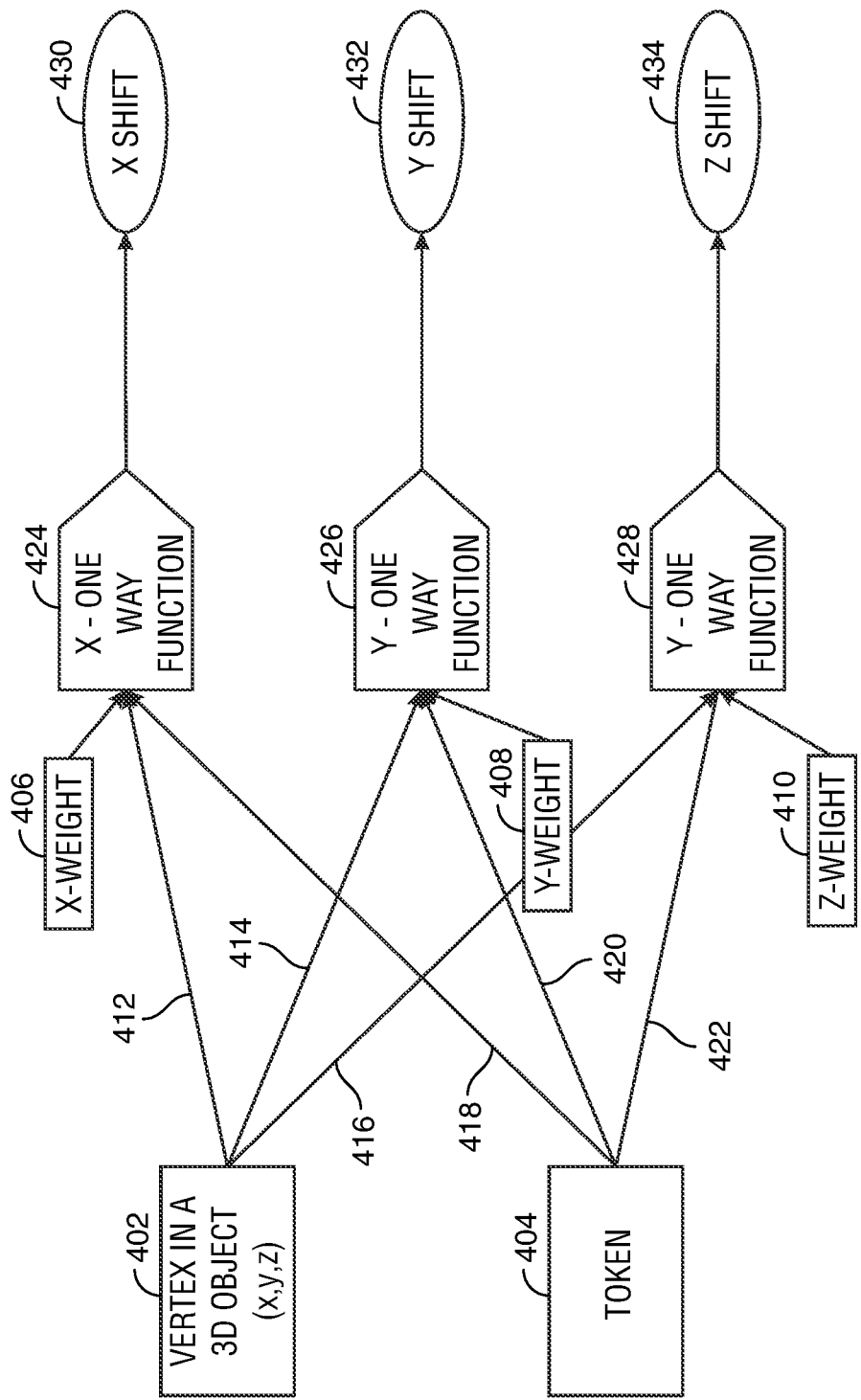
FIG. 4 shows an illustrative diagram in accordance with principles of the disclosure.

FIG. 4 shows an illustrative diagram of the process for distorting a base 3D mesh into a distorted base 3D mesh.

The distortion algorithm may use the vertex 402 and the random token 404 as the base data for executing the algorithm. Vertex 402 may include an x, y and z coordinate. For each coordinate, weight may be applied to the coordinate and a combination of the coordinate and the weight may be used to execute a one-way function to output a distorted coordinate.

Following the distorting of the vertex, the x-coordinate may be referred to as the x-shift, the y-coordinate may be referred to as the y-shift, and the z-coordinate may be referred to as the z-shift.

X-coordinate 412, token 404 and the x-weight 406, may be combined for performing the x-one way function 424. Token 404 may be combined, as shown at 418. The result of the x-one way function may be the x-shift 430. The x-weight may be a combination of data applied to the x-coordinate. The x-weight may include metadata associated with the user's device, metaverse environmental data and a time-stamp of registration of the user's device.

Y-coordinate 414, token 404 and the y-weight 408, may be combined for performing the y-one way function 426. Token 404 may be combined, as shown at 420. The result of the y-one way function may be the y-shift 432. The y-weight may be a combination of data applied to the y-coordinate. The y-weight may include metadata associated with the user's device, metaverse environmental data and a time-stamp of registration of the user's device.

Z-coordinate 416, token 404 and the z-weight 410, may be combined for performing the z-one way function 428. Token 404 may be combined, as shown at 422. The result of the z-one way function may be the z-shift 434. The z-weight may be a combination of data applied to the z-coordinate. The z-weight may include metadata associated with the user's device, metaverse environmental data and a time-stamp of registration of the user's device.

Figure 5:
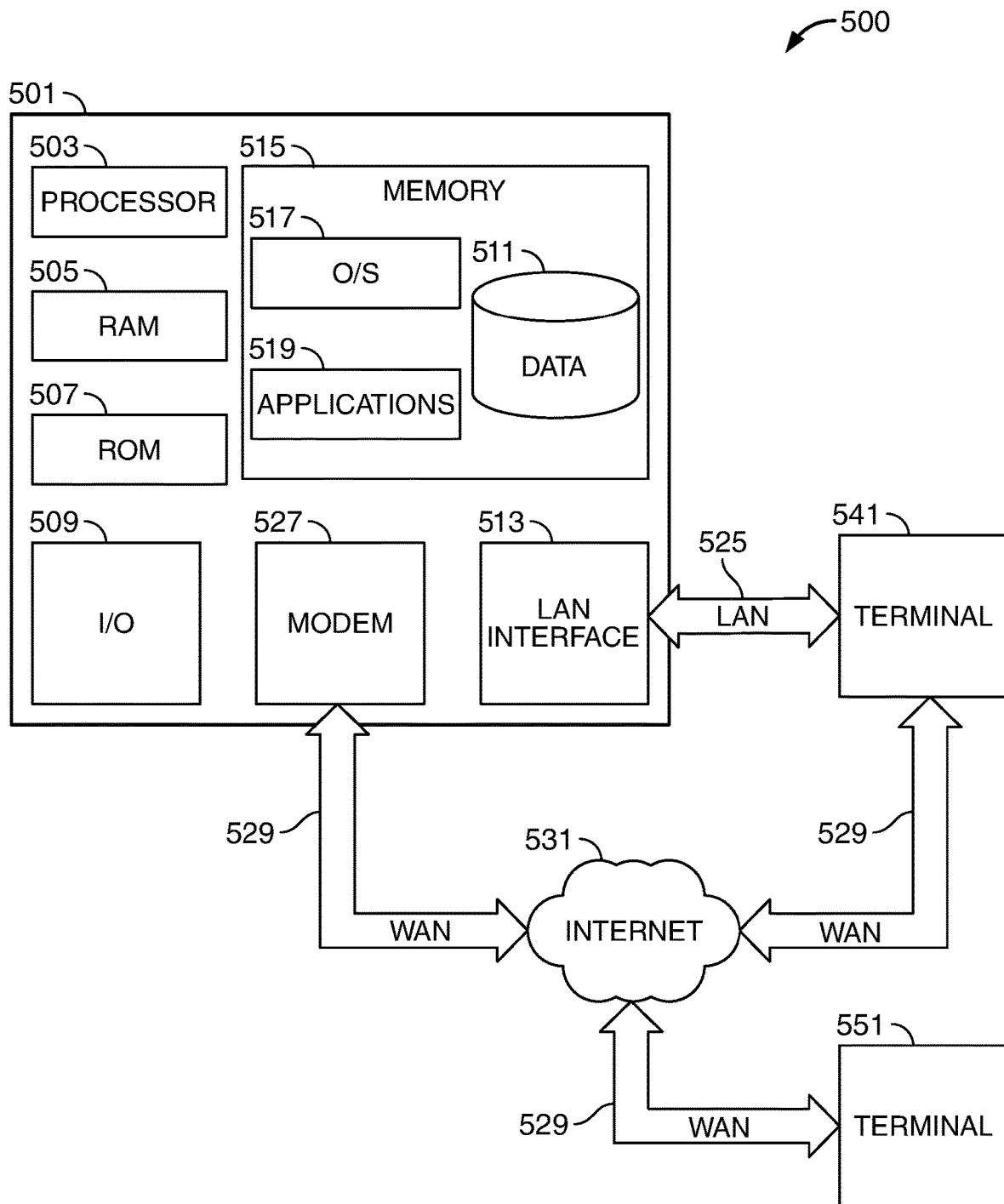
FIG. 5 shows an illustrative block diagram in accordance with principles of the disclosure.

FIG. 5 shows illustrative apparatus 500 that may be configured in accordance with the principles of the invention. FIG. 5 is a block diagram that illustrates a computing device 501 (alternatively referred to herein as a "server or computer") that may be used in accordance with the principles of the invention. The computer server 501 may have a processor 503 for controlling overall operation of the server and its associated components, including RAM 505, ROM 507, input/output ("I/O") module 509, and memory 515.

I/O module 509 may include a microphone, keypad, touch-sensitive screen and/or stylus through which a user of device 501 may provide input, and may also include one or more of a speaker for providing audio output and a video display device for providing textual, audiovisual and/or graphical output. Software may be stored within memory 515 and/or other storage (not shown) to provide instructions to processor 503 for enabling server 501 to perform various functions. For example, memory 515 may store software used by server 501, such as an operating system 517, application programs 519, and an associated database.

Alternatively, some or all of computer executable instructions of server 501 may be embodied in hardware or firmware (not shown).

Server 501 may operate in a networked environment supporting connections to one or more remote computers, such as terminals 541 and 551. Terminals 541 and 551 may be personal computers or servers that include many or all of the elements described above relative to server 501. The network connections depicted in FIG. 5 include a local area network (LAN) 525 and a wide area network (WAN) 529 but may also include other networks.

When used in a LAN networking environment, computer 501 is connected to LAN 525 through a network interface or adapter 513.

When used in a WAN networking environment, server 501 may include a modem 527 or other means for establishing communications over WAN 529, such as Internet 531.

It will be appreciated that the network connections shown are illustrative and other means of establishing a communications link between the computers may be used. The existence of any of various well-known protocols such as TCP/IP, Ethernet, FTP, HTTP, and the like is presumed, and the system may be operated in a client-server configuration to permit a user to retrieve web pages from a web-based server. Any of various conventional web browsers may be used to display and manipulate data on web pages.

Additionally, application program 519, which may be used by server 501, may include computer executable instructions for invoking user functionality related to communication, such as email, short message service (SMS), authentication services and voice input and speech recognition applications.

Computing device 501 and/or terminals 541 or 551 may also be mobile terminals including various other components, such as a battery, speaker, and antennas (not shown). Terminal 551 and/or terminal 541 may be portable devices such as a laptop, tablet, smartphone, or any other suitable device for receiving, storing, transmitting and/or displaying relevant information.

Any information described above in connection with database 511, and any other suitable information, may be stored in memory 515. One or more of applications 519 may include one or more algorithms that encrypt information, process received executable instructions, interact with enterprise systems, perform power management routines or other suitable tasks. Algorithms may be used to perform the functions of one or more of distorting the base 3D mesh, maintaining a metaverse session, interfacing with devices, managing metaverse interactions, authenticating an avatar and the virtual kiosk, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 6:
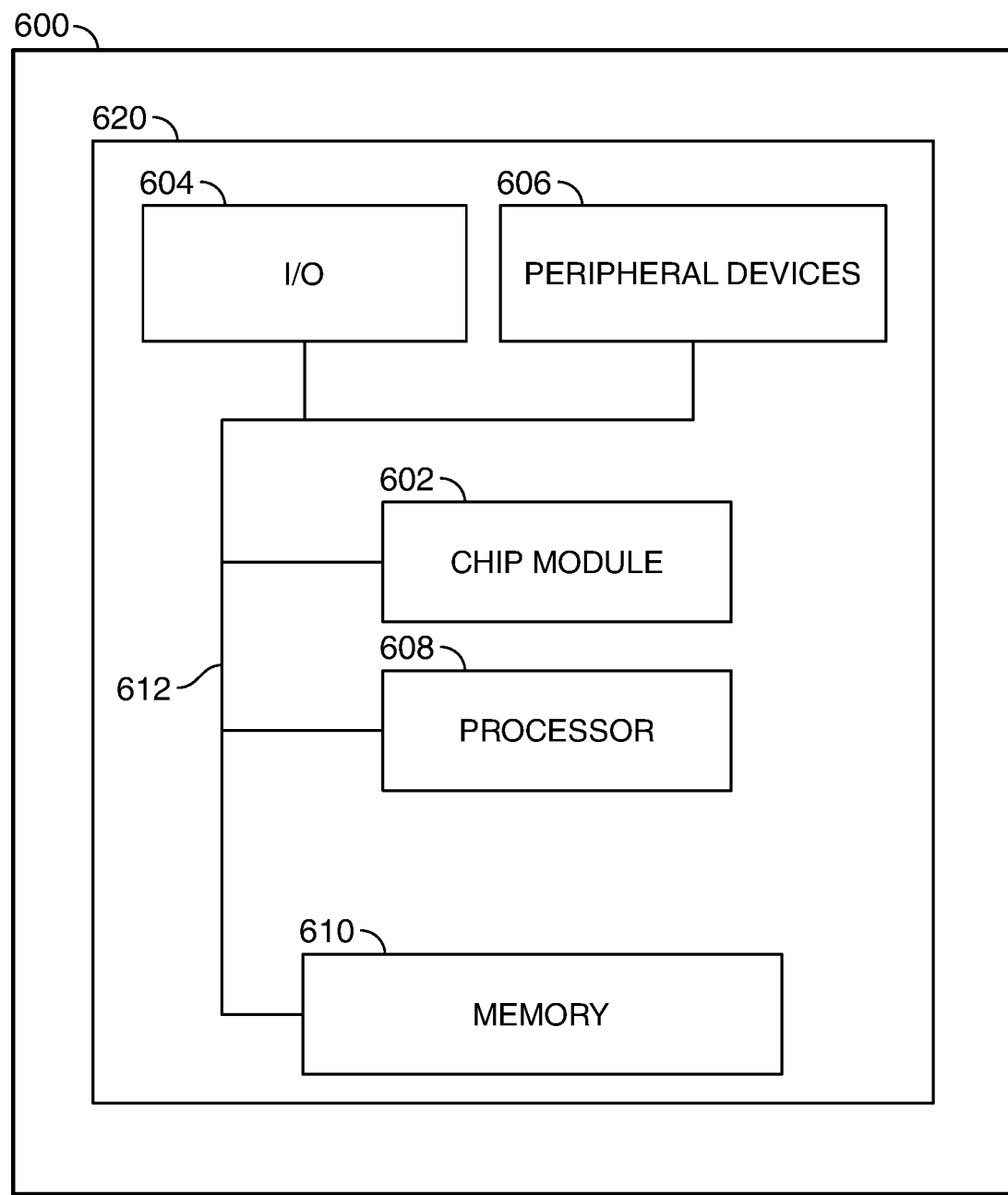
FIG. 6 shows an illustrative apparatus that may be configured in accordance with principles of the disclosure.

FIG. 6 shows an illustrative apparatus 600 that may be configured in accordance with the principles of the invention.

Apparatus 600 may be a computing machine. Apparatus 600 may include one or more features of the apparatus that is shown in FIG. 5.

Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable encoded media or devices; peripheral devices 606, which may include counter timers, real-time timers, power-on reset generators or any other suitable peripheral devices; logical processing device 608, which may maintain a metaverse session, interface with devices, manage metaverse interactions, verify user identity and perform other methods described herein; and machine-readable memory 610.

Machine-readable memory 610 may be configured to store in machine-readable data structures: customer identity profiles and account data, metaverse registration, metaverse session audit logs, avatar authentication data, virtual kiosk authentication data and any other suitable information or data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

Thus, systems and methods for authenticating a communication session in the metaverse environment is provided. Persons skilled in the art will appreciate that the present invention can be practiced by other than the described embodiments, which are presented for purposes of illustration rather than of limitation.

What is claimed is:

1. A method for authenticating a communication session in a metaverse environment, the method comprising, at a processor running a metaverse application:
   creating an authenticated communication session between a customer avatar and a virtual kiosk associated with an entity by authenticating the customer avatar and authenticating the virtual kiosk as being associated with the entity, the customer avatar controlled by input at a user device, the authenticating comprising:
   authenticating the customer avatar by:
      displaying, on an interface of the virtual kiosk, a plurality of base 3D mesh;
      receiving at the interface, a selection, via the customer avatar, of a base 3D mesh from the plurality of base 3D meshes;
      confirming, via the virtual kiosk, that the base 3D mesh matches a pre-selected base 3D mesh stored within an identity profile of the customer avatar at a database of the entity; and
      in response to the confirming, authenticating the customer avatar;
   authenticating the virtual kiosk by:
      executing a distortion function on the pre-selected base 3D mesh to generate a distorted base 3D mesh;
      comparing the distorted base 3D mesh to a static distorted base 3D mesh stored at the user's device;
      confirming that the distorted base 3D mesh matches the static distorted base 3D mesh; and
      in response to the confirming, authenticating the virtual kiosk as being associated with the entity; and
   in response to the authenticating of the customer avatar and the authenticating of the virtual kiosk, creating the authenticated communication session.

2. The method of claim 1 wherein prior to authenticating the customer avatar in the metaverse environment, the method comprises, performing a one-time registration of the user's device with the entity by creating the identity profile for the user's device, the creating of the identity profile comprising:
   selecting at the interface of the virtual kiosk, via the customer avatar, a base 3D mesh from a plurality of base 3D mesh displayed to the customer avatar, the base 3D mesh being the pre-selected base 3D mesh;
   receiving at the virtual kiosk, input of a password via the customer avatar, the password for being associated with the identity profile;
   generating, by the virtual kiosk, a random token based on metadata associated with the user's device, the metadata stored at the database; and
   storing, at the database, the pre-selected base 3D mesh and the random token as the identity profile for the customer avatar.

3. The method of claim 2 further comprising generating the static distorted base 3D mesh by executing the distortion function on the pre-selected base 3D mesh to generate the static distorted base 3D mesh, the distortion function comprising:
   combining a selected vertex at the base 3D mesh, the random token and metadata associated with a user of the user device to generate a distorted vertex;
   using the distorted vertex, creating a static distorted base 3D mesh;
   displaying the static distorted base 3D mesh to the customer avatar; and
   storing the static distorted base 3D mesh at the user's device.

4. The method of claim 2 wherein the metadata comprises device data associated with the user, a timestamp of registration of the user's device with the entity and metaverse environmental data.

5. The method of claim 3 wherein the selected vertex comprises an x-coordinate, a y-coordinate and a z-coordinate and the combining to generate the distorted vertex comprises:
   for the x-coordinate: amalgamating the x-coordinate, the random token and the metadata to generate a distorted x-coordinate;
   for the y-coordinate: amalgamating the y-coordinate, the random token, and the metadata to generate a distorted y-coordinate; and
   for the z-coordinate: amalgamating the z-coordinate, the random token and the metadata to generate a distorted z-coordinate.

6. The method of claim 5 wherein:
   the distorted x-coordinate comprises an expansion of at least one of:
      an expansion of the vertex along a positive x-axis;
      an expansion of the vertex along a negative x-axis; and
      an expansion of the vertex along both the positive x-axis and the negative x-axis;
   the distorted y-coordinate comprises an expansion of at least one of:
      an expansion of the vertex along a positive y-axis;
      an expansion of the vertex along a negative y-axis; and an expansion of the vertex along both the positive y-axis and the negative y-axis; and
the distorted z-coordinate comprises an expansion of at least one of:
an expansion of the vertex along a positive z-axis;
an expansion of the vertex along a negative z-axis; and
an expansion of the vertex along both the positive z-axis and the negative z-axis.

7. The method of claim 5 wherein the distorted vertex comprises a transforming of the selected vertex into a range of values along the x-axis, a range of values along the y-axis and a range of values along the z-axis.

8. The method of claim 4 wherein when the device data associated with the user has changed from a base-line value, the method comprises:
regenerating the static distorted base 3D mesh;
displaying the regenerated static distorted base 3D mesh to the customer avatar; and
overwriting the static distorted base 3D mesh stored at the user's device with the regenerated static distorted base 3D mesh.

9. The method of claim 2 wherein, prior to creating the authenticated communication session, further authenticating the customer avatar by:
requesting input of the password from the customer avatar;
receiving the password at the interface of the virtual kiosk; and
confirming that the password matches the password stored in the identity profile.

10. The method of claim 1 wherein the comparing of the distorted base 3D mesh to the static distorted base 3D mesh and the confirming that the generated distorted base 3D mesh matches the static distorted base 3D mesh, is performed by the customer avatar.

11. The method of claim 1 wherein the comparing of the distorted base 3D mesh to the static distorted base 3D mesh and the confirming that the generated distorted base 3D mesh matches the static distorted base 3D mesh, is performed automatically by an application programming interface ("API") associated with the virtual kiosk.

12. The method of claim 1 wherein the comparing of, the distorted base 3D mesh to the static distorted base 3D mesh and the confirming that the generated distorted base 3D mesh matches the static distorted base 3D mesh is performed by both the customer avatar and the API, wherein the confirming by the API provides an added layer of authentication.

13. The method of claim 1 wherein when either the customer avatar is not authenticated or the virtual kiosk is not authenticated, the method comprises terminating the creating of the authenticated session.

14. A system for authenticating a communication session within a metaverse environment, the system comprising:
a virtual kiosk located within the metaverse environment, the virtual kiosk represents an entity, the virtual kiosk in communication with one or more entity databases that are linked to one or more entity hardware processors and one or more entity servers; and
a customer avatar located within the metaverse environment, the customer avatar represents a user, the customer avatar being controlled by input at a user's device;
wherein:
during a registration process, the one or more entity servers:
receives a selection of a base 3D mesh from a first plurality of base 3D mesh displayed at an interface of the virtual kiosk;
receives input of a username and password;
generates a random token based on metadata associated with the user's device, the metadata stored at the one or more entity databases;
creates an identity profile for the user's device, the identity profile comprising the username, the password, the random token and the base 3D mesh selected from the first plurality of base 3D meshes, the base 3D mesh being a pre-selected base 3D mesh;
stores the identity profile at the one or more entity databases;
executes a distortion function on the pre-selected base 3D mesh, the distortion function outputting a static distorted base 3D mesh;
displays the static distorted base 3D mesh to the customer avatar; and
transmits the static distorted base 3D mesh to the user's device for storage;
wherein during an authentication process:
the one or more entity servers verifies the customer avatar by:
displaying on the interface of the virtual kiosk a second plurality of base 3D meshes, the second plurality of base 3D meshes including the pre-selected base 3D mesh;
receiving a selection of a base 3D mesh from the second plurality of base 3D meshes;
confirming that the base 3D mesh selected from the second plurality of base 3D meshes matches the pre-selected base 3D mesh; and
in response to the confirming, authenticating the customer avatar;
the one or more entity servers authenticates the virtual kiosk as being associated with the entity by:
executing the distortion function on the pre-selected base 3D mesh to generate a distorted base 3D mesh;
displaying the distorted base 3D mesh on the interface of the virtual kiosk;
receiving confirmation from the customer avatar that the generated distorted base 3D mesh matches the static distorted base 3D mesh; and
in response to the confirming, authenticating the virtual kiosk; and
in response to the authenticating of the customer avatar and the authenticating of the virtual kiosk, creating the communication session.

15. The system of claim 14 wherein the executing of the distortion function on the pre-selected base 3D mesh to output a static distorted base 3D mesh comprises the one or more entity servers to:
combine a selected vertex at the base 3D mesh, the random token and metadata associated with the user's device to generate a distorted vertex;
using the distorted vertex, create a static distorted base 3D mesh;
display the static distorted base 3D mesh to the customer avatar; and
store the static distorted base 3D mesh at the user's device.

16. The system of claim 14 wherein the metadata comprises device data associated with the user, a timestamp of registration of the user's device with the entity and metaverse environmental data.

17. The system of claim 14 wherein in response to the authenticating of the customer avatar and the authenticating of the virtual kiosk, the one or more entity servers further authenticates the customer avatar by:
prompting the customer avatar for input of a password;
receiving input of the password; and
confirming that the password inputted matches the password stored in the identity profile.

18. A method for authenticating a communication session in a metaverse environment, the method comprising, at a processor running a metaverse application:
creating an authenticated communication session between a user device and a virtual kiosk associated with an entity by authenticating the user device and authenticating the virtual kiosk as being associated with the entity, the authenticating comprising:
authenticating the user device by:
displaying, on an interface of the virtual kiosk, a plurality of base 3D mesh;
receiving at the interface, a selection of a base 3D mesh from the plurality of base 3D meshes;
confirming, via the virtual kiosk, that the base 3D mesh matches a pre-selected base 3D mesh stored within an identity profile associated with the user's device at a database of the entity; and
in response to the confirming, authenticating the user's device;
following the authenticating of the user's device, authenticating the virtual kiosk by:
executing a distortion function on the pre-selected base 3D mesh to generate a distorted base 3D mesh;
comparing the distorted base 3D mesh to a static distorted base 3D mesh stored at the user's device;
confirming that the generated distorted base 3D mesh matches the static distorted base 3D mesh; and
in response to the confirming, authenticating the virtual kiosk; and
in response to the authenticating of the user's device and the authenticating of the virtual kiosk, creating the authenticated communication session.

19. The method of claim 18 wherein prior to authenticating the user's device, the method comprises, performing a one-time registration of the user's device with the entity by creating the identity profile for the user's device, the creating of the identity profile comprising:
receiving a selection of a base 3D mesh from a plurality of base 3D mesh displayed on an interface of the virtual kiosk, the base 3D mesh being the pre-selected base 3D mesh;
receiving at the virtual kiosk, input of a password, the password for being associated with the identity profile;
generating, by the virtual kiosk, a random token based on metadata associated with the user's device, the metadata stored at the database; and
storing, at the database, the pre-selected base 3D mesh and the random token as the identity profile for the user's device.

20. The method of claim 19 further comprising generating the static distorted base 3D mesh by executing the distortion function on the pre-selected base 3D mesh to generate the static distorted base 3D mesh, the distortion function comprising:
combining a selected vertex at the base 3D mesh, the random token and metadata associated with a user of the user device to generate a distorted vertex;
using the distorted vertex, creating a static distorted base 3D mesh;
displaying the static distorted base 3D mesh at the interface; and
storing the static distorted base 3D mesh at the user's device.

* * * * *